United States Patent
Tsiaflakis et al.

(10) Patent No.: US 12,317,013 B2
(45) Date of Patent: May 27, 2025

(54) BANDWIDTH ALLOCATION

(71) Applicant: Nokia Solutions and Networks Oy, Espoo (FI)

(72) Inventors: Paschalis Tsiaflakis, Heist-op-den-Berg (BE); Konstantinos Christodoulopoulos, Stuttgart (DE); Sarvesh Sanjay Bidkar, Kornwestheim (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 150 days.

(21) Appl. No.: 17/954,918

(22) Filed: Sep. 28, 2022

(65) Prior Publication Data

US 2023/0095840 A1 Mar. 30, 2023

(30) Foreign Application Priority Data

Sep. 30, 2021 (EP) .................................. 21200327

(51) Int. Cl.
*H04Q 11/00* (2006.01)
*H04L 47/625* (2022.01)

(52) U.S. Cl.
CPC ....... *H04Q 11/0067* (2013.01); *H04L 47/626* (2013.01); *H04Q 2011/0086* (2013.01)

(58) Field of Classification Search
None
See application file for complete search history.

(56) References Cited

U.S. PATENT DOCUMENTS

| | | | |
|---|---|---|---|
| 8,406,235 B2* | 3/2013 | Walton | H04L 47/803 370/395.43 |
| 9,455,913 B2* | 9/2016 | Naaman | H04L 47/10 |
| 11,356,380 B1* | 6/2022 | White | H04L 47/626 |
| 11,438,274 B2* | 9/2022 | Garcia | H04L 43/0858 |
| 11,564,021 B2* | 1/2023 | Pauwels | H04Q 11/0066 |
| 2014/0053272 A1* | 2/2014 | Lukacs | G06F 21/53 718/1 |
| 2023/0208571 A1* | 6/2023 | Jones | H04L 45/302 370/389 |

OTHER PUBLICATIONS

European Search Report for European Patent Application No. 21200327 dated Mar. 11, 2022.

(Continued)

*Primary Examiner* — Jai M Lee
(74) *Attorney, Agent, or Firm* — Harness, Dickey & Pierce, P.L.C.

(57) ABSTRACT

An optical line terminal is disclosed. The optical line terminal comprises at least one processor; and at least one memory including machine-readable instructions. The at least one memory and the machine-readable instructions are configured to, with the at least one processor, cause the optical line terminal to determine based on one or more variables a relationship between bandwidth efficiency and latency for communication of contents of a queue buffer of an optical network unit with the optical line terminal via an optical distribution network, and determine a burst schedule for the queue buffer based on the determined relationship.

15 Claims, 8 Drawing Sheets

(56) References Cited

OTHER PUBLICATIONS

Francois Fredricx Nokia Belgium: "ITU-T Rec. Series G Supplement CO OBA: OL T Capabilities for supporting CO OBA (for Agreement);TD717/PLEN", ITU-T Draft; Study Period 2021-2024; Study Group 15; Series TD717/PLEN, International Telecommunication Union, Geneva ; CH vol. 2/15 Mar. 30, 2021 (Mar. 30, 2021), pp. 1-32, XP044309224.
Bidkar Sarvesh et al: "Low-Latency TOM-PON for 5G Xhaul", 2020 22nd International Conference on Transparent Optical Networks (ICTON), IEEE, Jul. 19, 2020 (Jul. 19, 2020), pp. 1-4, XP033828916.
Zhang Shizong et al: "Efficient polling cycle adaptive passive optical network for low-latency 5G fronthaul", Optical Switching and Networking, vol. 33 , pp. 122-130, XP085716721, Dec. 12, 2017.

* cited by examiner

| ALLOC ID | START TIME | GRANT SIZE | ALLOC ID | START TIME | GRANT SIZE | ALLOC ID | START TIME | GRANT SIZE |
|---|---|---|---|---|---|---|---|---|
| A | | | B | | | C | | |

BANDWIDTH ALLOCATION

CROSS-REFERENCE TO RELATED APPLICATIONS

This application claims priority to and the benefit of European Patent Application No. 21200327.1 filed on Sep. 30, 2021, the entire contents of each of which are incorporated herein by reference.

FIELD OF THE DISCLOSURE

The present disclosure relates to bandwidth allocation in a communications network.

BACKGROUND OF THE DISCLOSURE

Passive Optical Networks (PON) are used to deliver broadband access services. PON systems have a point-to-multipoint topology, in which an optical line terminal (OLT) at the network side is used to connect to a multitude of user modems, called Optical Network Units (ONU), at the user side via an Optical Distribution Network (ODN) which includes a passive optical power splitter. Since communication links of the ODN are shared, the ONUs are scheduled by the OLT to transmit in the upstream direction by Time Division Multiplexing (TDM), wherein transmission timeslots (also referred to as bursts) are allocated to traffic-bearing entities (TCONTs) within the ONUs.

SUMMARY OF THE DISCLOSURE

A first aspect of the present disclosure provides an optical line terminal comprising: at least one processor; and at least one memory including machine-readable instructions; wherein the at least one memory and the machine-readable instructions are configured to, with the at least one processor, cause the optical line terminal to: determine based on one or more variables a relationship between bandwidth efficiency and latency for communication of contents of a queue buffer of an optical network unit with the optical line terminal via an optical distribution network, and determine a burst schedule for the queue buffer based on the determined relationship.

In an implementation, the at least one memory and the machine-readable instructions are configured to, with the at least one processor, cause the optical line terminal to determine the burst schedule for the queue buffer by: determining a bandwidth for communication of contents of the queue buffer of the optical network unit with the optical line terminal, determining a burst parameters assignment for communication of contents of the queue buffer of the optical network unit with the optical line terminal based on the determined bandwidth, and determining the burst schedule based on the determined burst parameters assignment.

In an implementation, the at least one memory and the machine-readable instructions are configured to, with the at least one processor, cause the optical line terminal to determine the bandwidth based on the determined relationship.

In an implementation, the at least one memory and the machine-readable instructions are configured to, with the at least one processor, cause the optical line terminal to determine the burst schedule for the queue buffer by: determining a burst parameters assignment for communication of contents of the queue buffer of the optical network unit with the optical line terminal based on the determined relationship, and determining the burst schedule based on the determined burst parameters assignment.

In an implementation, the at least one memory and the machine-readable instructions are configured to, with the at least one processor, cause the optical line terminal to determine the bandwidth by: selecting a function of a plurality of functions stored in the at least one memory or modifying a parameter of a function stored in the at least one memory based on the determined relationship, and determining the bandwidth based on the selected or modified function.

In an implementation, the at least one memory and the machine-readable instructions are configured to, with the at least one processor, cause the optical line terminal to determine the burst parameters assignment by: selecting a function of a plurality of functions stored in the at least one memory or modifying a parameter of a function stored in the at least one memory based on the determined relationship, and determining the burst parameters assignment based on the selected or modified function.

In an implementation, the at least one memory and the machine-readable instructions are configured to, with the at least one processor, cause the optical line terminal to determine the relationship by: retrieving from the at least one memory a variable characterising the relationship between bandwidth efficiency and latency for the communication.

In an implementation, the at least one memory and the machine-readable instructions are configured to, with the at least one processor, cause the optical line terminal to determine the relationship by: receiving as an input to the optical line terminal a variable defining a communication preference for a communication of contents of the queue buffer of the optical network unit with the optical line terminal and determining the relationship based on the communication preference.

In an implementation, the at least one memory and the machine-readable instructions are configured to, with the at least one processor, cause the optical line terminal to determine the relationship by: evaluating a variable representing a utilisation rate of the optical distribution network for prior communications between the optical network unit and the optical line terminal and determining the relationship based on the utilisation rate.

In an implementation, the at least one memory and the machine-readable instructions are configured to, with the at least one processor, cause the optical line terminal to determine the relationship by: characterising a variable representing a type of communications of contents of the queue buffer of the optical network unit with the optical line terminal and determining the relationship based on the type of communications.

In an implementation, the at least one memory and the machine-readable instructions are configured to, with the at least one processor, cause the optical line terminal to determine the relationship by: identifying a time for communications of contents of the queue buffer of the optical network unit with the optical line terminal based on a time-denoting variable and determining the relationship based on the identified time.

In an implementation, the optical network unit comprises a plurality of discrete queue buffers, and the at least one memory and the machine-readable instructions are configured to, with the at least one processor, cause the optical line terminal to determine respective burst schedules for each of the plurality of queue buffers.

A second aspect of the present disclosure provides a computer-implemented method for determining a burst schedule for a queue buffer of an optical network unit, the method comprising: determining based on one or more variables a relationship between bandwidth efficiency and latency for communication of contents of the queue buffer with an optical line terminal via an optical distribution network, and determining a burst schedule for the queue buffer based on the determined relationship.

A third aspect of the present disclosure provides a computer program comprising instructions, which, when executed by a computer, cause the computer to carry out the method of the preceding statement.

These and other aspects of the invention will be apparent from the embodiment(s) described below.

BRIEF DESCRIPTION OF THE DRAWINGS

In order that the present invention may be more readily understood, embodiments of the invention will now be described, by way of example, with reference to the accompanying drawings, in which.

DETAILED DESCRIPTION OF THE DISCLOSURE

Figure 1:
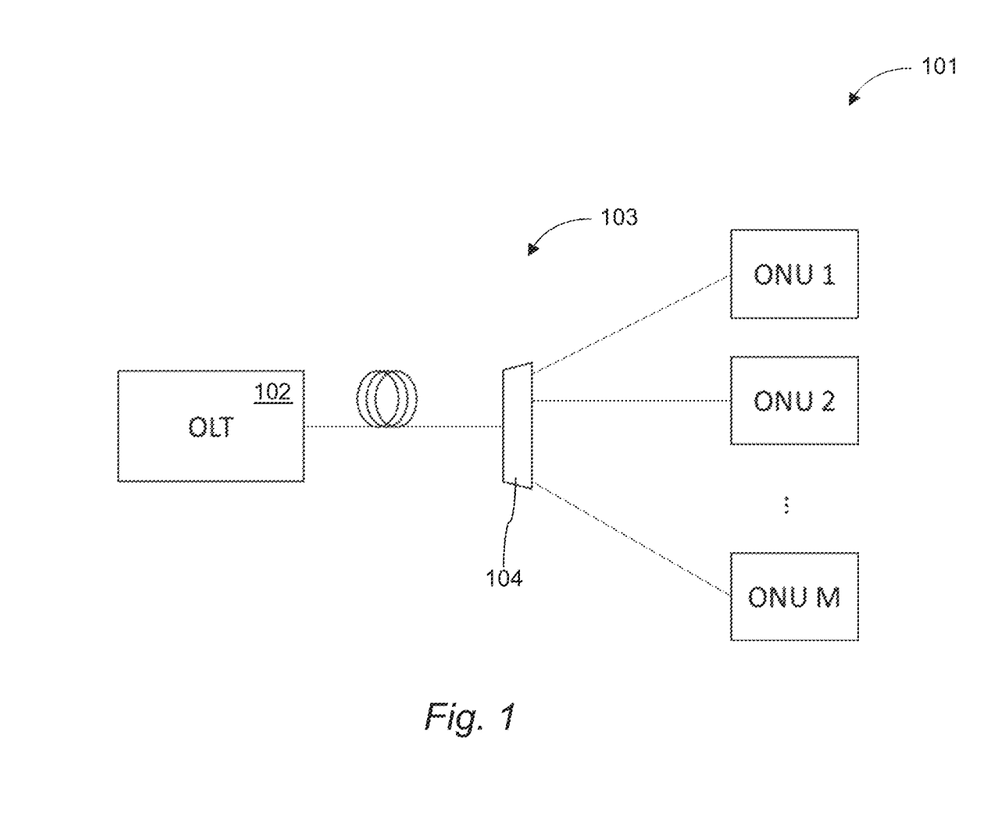
FIG. 1 shows schematically an example of a communications network embodying an aspect of the present disclosure, comprising an optical line terminal and a plurality of optical network units.

Referring firstly to FIG. 1, a communications network 101 embodying an aspect of the present disclosure has a point-to-multi-point (P2MP) topology and comprises an optical line terminal (OLT) 102 at the network side, a plurality of user modems ONU 1 to ONU M, called Optical Network Units (ONU), at the user side, and an Optical Distribution Network (ODN) indicated generally at 103 for communicating the OLT 102 with the plurality of ONUs. The ODN 103 comprises a passive optical power splitter 104 for splitting and combining communication channels between the OLT and the ONUs. In the example, the communications network 101 is a passive optical network (PON), for example, a 10-Gigabit symmetric PON (XGS-PON) conforming to the ITU-T G.9807.1 standard, or a 50-Gigabit PON (G.hsp) conforming to the ITU-T G.9804.1/2/3. In examples, the communications network 101 may be deployed for delivering broadband access services.

Since communication links, e.g., optical fibre channels, of the ODN 103 are shared by the plurality of ONUs, the ONUs are scheduled by the OLT to transmit in the upstream direction by a Time Division Multiplexing (TDM) technology, for example, by a TDM method or a time-and-wavelength-division multiplexing (TDWM) method. This is also referred to as burst mode upstream transmission. By such a method time division is performed on the bandwidth of the ODN, such that bandwidth resource is allocated to the ONUs. Such bandwidth allocation may be performed statically, whereby a bandwidth allocation may be made during provisioning of the communication network, or may be performed dynamically, i.e., by Dynamic Bandwidth Allocation (DBA), whereby bandwidth may be allocated by the OLT dynamically during operation of the communication network, based on contemporaneous monitoring of traffic conditions. Using DBA the OLT allocates upstream transmission opportunities, or upstream bandwidth allocations, which are implemented by allocating timeslots for burst transmissions at specific times to the ONUs based on dynamically estimated indications of their activity and their respective configured traffic contracts (i.e., Service Layer Agreements). In examples, each of the ONUs 1 to M holds a plurality of traffic bearing entities, also referred to as Transmission Containers (T-CONTs). A T-CONT is an ONU object representing a group of logical connections that appear as a single entity for the purpose of upstream transmission bandwidth allocation by the OLT, i.e., that appear as a queue buffer. Each traffic bearing entity, or T-CONT, thus represents a queue buffer. In examples, the bandwidth allocation can be performed on a per T-CONT basis. Each ONU may support a plurality of such T-CONTs, each of which may represent a queue buffer for a particular type of traffic (for example, video, voice or data) or even a specific combination of those. The queue buffer represented by each T-CONT may, for example, be constituted by one or a plurality of physical buffers.

In many applications, e.g., the XGS-PON application, DBA is a preferred mode of bandwidth allocation as it may desirably allow for more efficient bandwidth allocation. For example, using DBA, transmission opportunities/timeslots may be allocated based on the real-time traffic demand of the ONUs, thereby maximising the utilisation of the available ODN bandwidth resource. DBA may thereby desirably facilitate deployment of a greater number of ONUs for an ODN with a given bandwidth capacity, and/or may allow provision to the ONUs of enhanced services, such as services requiring variable rates with peaks exceeding bandwidth levels that could practicably be allocated statically to all ONUs.

In the example the communication network 101 is depicted as comprising three ONUs, 1 to M. In practice however communication networks embodying the present disclosure may comprise more or fewer ONUs, for example, 512 ONUs.

Figure 2:
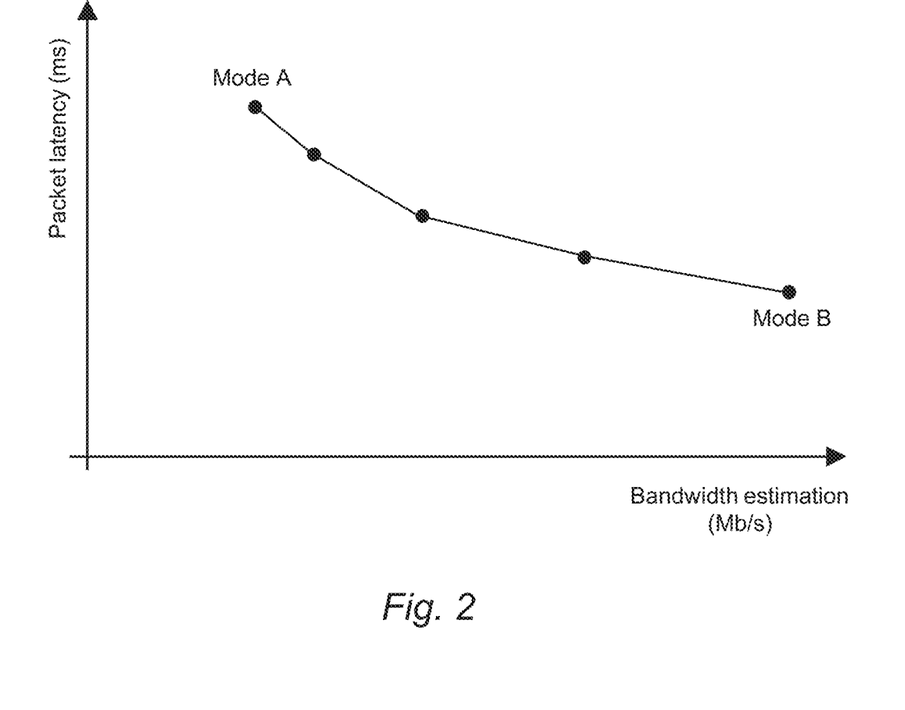
FIG. 2 shows schematically a plot of latency as a function of bandwidth estimation for an example communication system.

Referring next to FIG. 2, in the case that bandwidth resource of the ODN is relatively scarce in comparison to the traffic demand of the subscribed ONUs, efficient bandwidth allocation among the ONUs (or T-CONTs thereof) is desirable to allow maximal utilisation of the bandwidth resource. In other words, it is desirable in such a scenario that over-allocation of bandwidth to ONUs is minimised, to thereby avoid undesirable un-utilised, 'wasted', bandwidth. Bandwidth efficiency thus relates to how efficiently ODN bandwidth is allocated to the T-CONTS. Conversely however under-allocation of bandwidth to ONUs may undesirably impair communications between the ONUs and the OLT, and in particular may result in increased (packet scheduling) latency of communications, which increased latency may be unacceptable in some applications. Latency refers to the time that data objects, such as packets, have to wait in the buffer queue (T-CONT) of the ONU before they are sent in an upstream burst towards the OLT. Since flows typically consist of several packets, the metric used can be the average latency, or another latency-relevant statistic, e.g., maximum, minimum, 25th percentile, etc. It may thus be understood that bandwidth efficiency and latency (or average queue buffer fill) are strongly coupled, to the extent that changing the bandwidth allocation to improve the bandwidth efficiency may impact the latency of communications, and vice versa.

This pareto optimality situation between bandwidth efficiency and latency is schematically illustrated in FIG. 2, in which for an example communication system the bandwidth estimation (which is itself typically inversely proportional to the bandwidth efficiency) plotted on the X-axis can be seen to be negatively correlated with an average packet scheduling latency plotted on the Y-axis. Thus it can be seen that the latency of communications decreases with increasing bandwidth estimation (and thus decreasing bandwidth efficiency). Consider for example the two modes of operation A and B. Operation of the example communication system in mode A results in low bandwidth estimation (and thus high bandwidth efficiency) but high latency. Whereas operation of the communication system in mode B in which the bandwidth estimation is increased (and so bandwidth efficiency reduced) desirably reduces latency.

An objective of bandwidth allocation is thus to allocate bandwidth to each ONU efficiently, i.e., such that the bandwidth allocated to each ONU corresponds closely to the actual traffic demand of the ONU, and that both over and under allocation of bandwidth resource to ONUs is minimised.

Bandwidth allocation may be performed by the OLT based on variables such as provisioned traffic control parameters, referred to as traffic descriptors, for an ONU (or T-CONTs thereof, as noted above). Such traffic descriptors may include bandwidth related parameters defining, for example, fixed bandwidth, assured bandwidth, and/or maximum bandwidth parameters, and latency related parameters, for example, jitter tolerance and/or maximum delay, as noted in, e.g., the International Telecommunication Union Telecommunication Standardization Sector (ITU-T) standard G.9807, for example section C.7.1.1. In this connection, a new (extra) parameter related to the relationship between bandwidth efficiency and latency can be added to the traffic descriptor. The parameter indicates the priority given to bandwidth efficient versus latency sensitive operation of the active traffic flow, within the bounds indicated by the other parameters. For instance, a low value parameter configuration indicates a desire for a trade-off with a relatively higher bandwidth efficiency (e.g., smaller bandwidth assignment) resulting in a relatively higher latency (e.g., larger average queue fill), whereas a high value parameter configuration indicates a desire for a trade-off with a relatively lower bandwidth efficiency (e.g., higher bandwidth assignment) resulting in relatively lower latency (e.g., smaller average queue fill).

A deficiency is identified in PONs utilising such traffic descriptors for bandwidth allocation, in that such descriptors may result in inefficient bandwidth allocation. For example, a provisioned traffic descriptor may define a maximum latency time for an ONU (or a T-CONT thereof) that is infeasible to achieve in a particular application, for example, in result of the nature of the traffic. Such a scenario may ordinarily result in an excessively high bandwidth allocation, notwithstanding that the specified latency still cannot be satisfied. In general, the traffic descriptors provide the bounds. In the example described above, the bounds may not be correct or it may not be possible to meet them. However, even if the bounds are correct there can be space that is harvested. For example, the DBA can allocate from the assured (e.g., 10 Mbps) to the maximum bandwidth (100 Mbps), where assured and maximum bandwidth can be provisioned parameters.

It has been identified therefore that the efficiency of bandwidth allocation in a PON, for example, an XGS-PON of the type depicted schematically in FIG. 1, may in some applications be desirably enhanced by allocating bandwidth to ONUs (or T-CONTs thereof) based on a control parameter, i.e., a traffic descriptor, defining a desired relationship between bandwidth efficiency and latency for the communications. For example, such an allocation method may desirably avoid over-allocation of bandwidth to ONUs (or T-CONTS thereof), and thereby improve bandwidth efficiency whilst maintaining a given latency. Aspects of the present disclosure thus concern bandwidth allocation in a P2MP shared channel communication network, such as a PON, based at least in part on a desired bandwidth efficiency versus latency characteristic.

Figure 3:
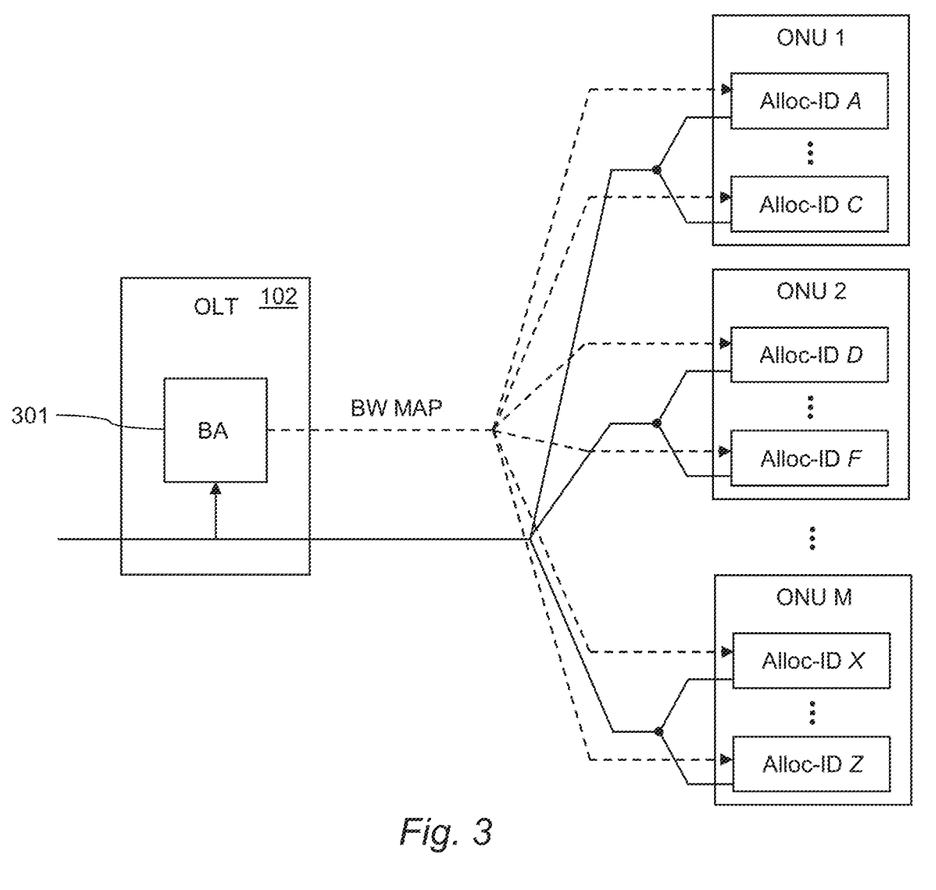
FIG. 3 shows schematically the optical line terminal and the plurality of optical network units identified previously with reference to FIG. 1.

Referring next to FIG. 3, in the example, the OLT 102 comprises a bandwidth allocation module 301 for allocating bandwidth resource of the ODN 103 to the plurality of ONUs 1 to M. In examples, the bandwidth allocation module 301 is a dynamic bandwidth allocation module for dynamically allocating bandwidth to the ONUs.

Each of the ONUs comprises one or a plurality of T-CONTs. Each T-CONT in the network is identified by a unique allocation identifier (Alloc-ID) known to the OLT. The Alloc-IDs are identifiers (e.g., numbers) that the OLT assigns to the ONUs to identify a T-CONT that is a recipient of upstream bandwidth allocations within the respective ONU. Thus, in the example, ONU 1 supports T-CONTs identified by Alloc-IDs A to C, ONU 2 supports T-CONTs identified by Alloc-IDs D to F, and ONU M supports T-CONTs identified by Alloc-IDs X to Z.

In examples, each T-CONT, or Alloc-ID, is provisioned with traffic control parameters, i.e., traffic descriptors, which define a service level of the respective T-CONT, which traffic descriptors or service parameters are stored in memory of the bandwidth allocation module 301. For example, the traffic descriptors may include a traffic descriptor defining a desired relationship between bandwidth efficiency and latency for communications between the respective T-CONT and the OLT 102.

Using DBA the OLT 102 allocates upstream transmission opportunities, or upstream bursts, to the T-CONTs within the subscribing ONUs on a per T-CONT basis. The OLT can make use of dynamically estimated indications of the ONUs and T-CONTs activity and their respective provisioned traffic contracts (i.e., Service Layer Agreements), defined by traffic control parameters, referred to as traffic descriptors. The activity status indications can be either explicit through buffer status reporting, implicit through transmission of idle XGEM frames during their upstream transmission opportunities, or both. After the estimation, the OLT performs bandwidth allocation, which is then used for burst parameters assignment (or allocation). Based on those, the burst schedule, which defines the exact timing of bursts for each T-CONT, is calculated. The OLT grants these bursts to the ONUs, on a per T-CONT basis, via a bandwidth map, indicated in FIG. 3 by the broken line, which comprises control signals sent in a downstream direction. The ONUs then control the transmissions of their queue buffers/T-CONTs in accordance with the bandwidth grants defined in the bandwidth map.

Figure 4:
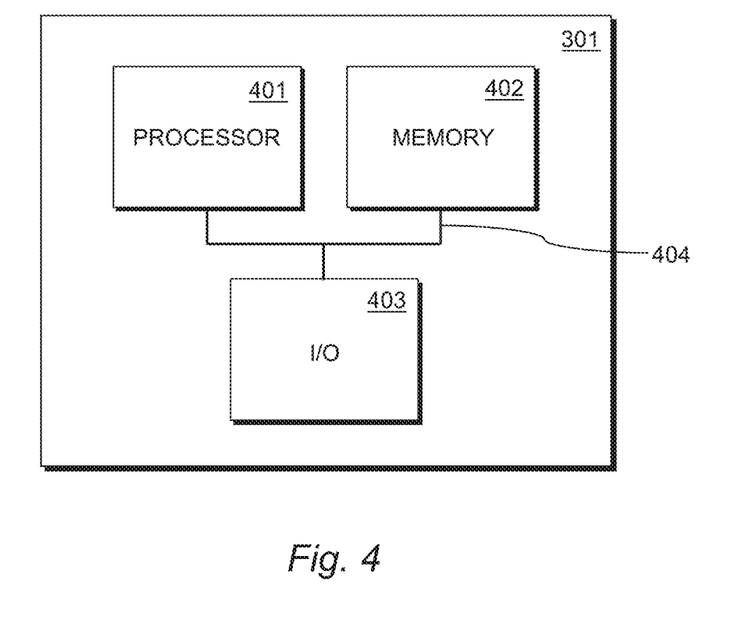
FIG. 4 shows schematically components of a bandwidth allocation module of the optical line terminal.

Referring next to FIG. 4, in examples, the bandwidth allocation module 301 of the OLT 102, comprises a processor 401, memory 402, input/output interface 403, and system bus 404. The bandwidth allocation module 301 is configured to run a computer program for dynamically allocating bandwidth of the ODN, which will be translated into upstream transmission opportunities (bursts), to the plurality of ONUs, for example, on a per T-CONT basis.

Processor 401 is configured for execution of instructions of a computer program for dynamically allocating bandwidth of the ODN to the plurality of ONUs. Memory 302 is configured for non-volatile storage of the computer program, defining machine-readable instructions, for execution by the processor 401, and for serving as read/write memory for storage of operational data associated with computer programs executed by the processor 301. Input/output interface 403 is provided for connection of the bandwidth allocation module 301 to other components of the OLT 102, and for connection of the bandwidth allocation module 301 to the ODN 103 to facilitate exchange of information, e.g., upstream status reports and downstream bandwidth maps, between the bandwidth allocation module 301 and the ONUs 1 to M. The components 401 to 403 of the bandwidth allocation module 301 are in communication via system bus 404.

Figure 5:
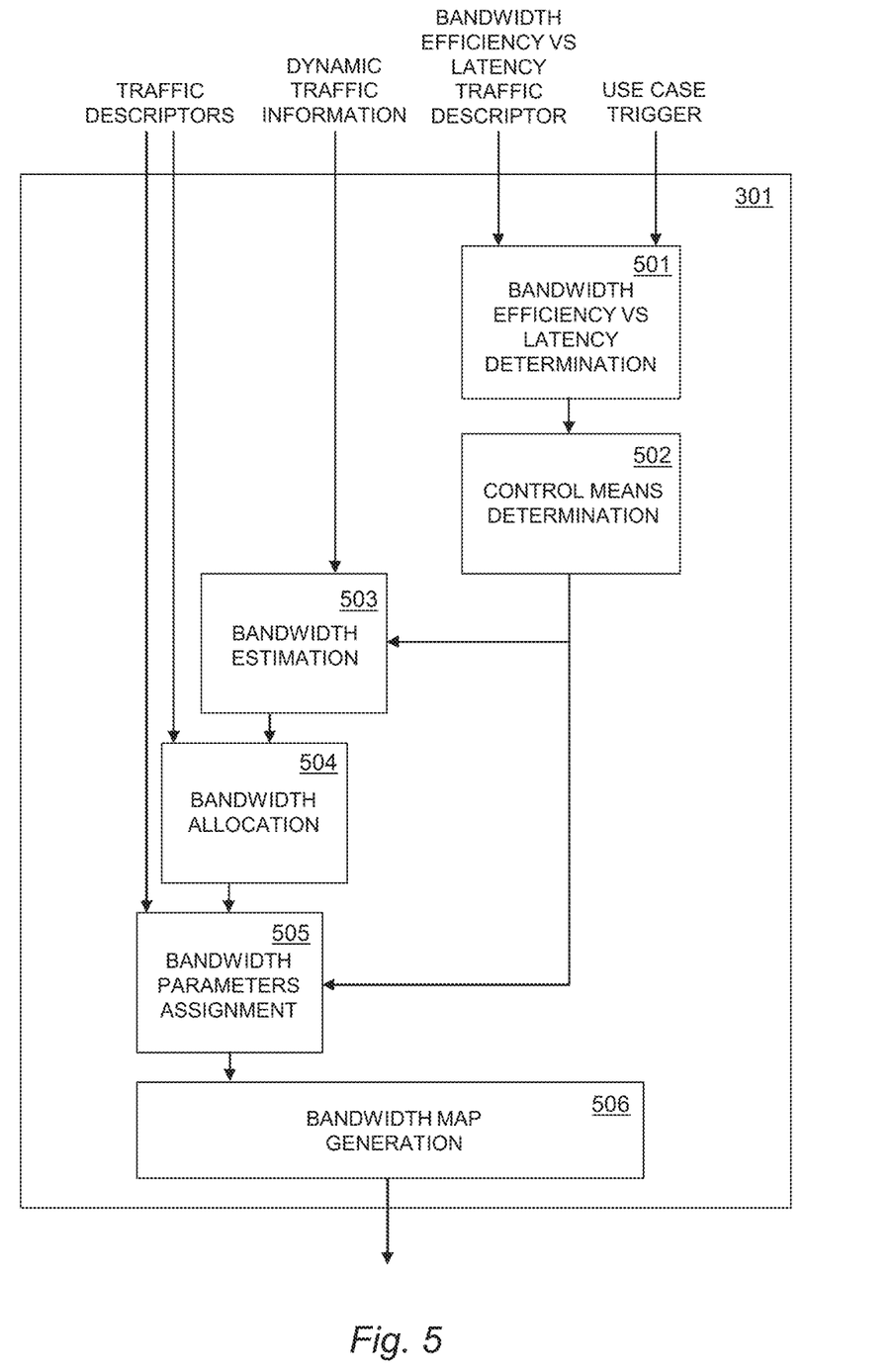
FIG. 5 shows schematically sub-modules of the bandwidth allocation module.

Referring next to FIG. 5, in examples, the components 401 to 403 of the bandwidth allocation module 301 support a plurality of functional sub-modules, 501 to 506, for dynamically allocating bandwidth to the T-CONTs of the ONUs 1 to M. In the Figure, logical connections between the sub-modules 501 to 506 are depicted schematically by arrows, whereby a direction of the arrow denotes a typical direction of data flow between connected sub-modules.

Bandwidth efficiency versus latency determination sub-module 501 is configured to determine, based on one or more variables, a desired relationship between bandwidth efficiency and latency for communications between each ONU and the OLT. In examples to be described in detail herein, the dynamic bandwidth allocation module 301 is configured to allocate bandwidth to the ONUs on a per T-CONT basis, i.e., such that each of the T-CONTs (Alloc-ID A to Alloc-ID Z) is granted an individual bandwidth allocation. In these examples bandwidth efficiency versus latency determination sub-module 501 is configured to determine a respective desired relationship between bandwidth efficiency and latency for communications between each T-CONT and the OLT.

Bandwidth efficiency versus latency determination sub-module 501 receives as an input one or more variables relevant to the determination. In the example, the input variables include a provisioned traffic descriptor defining a desired bandwidth efficiency versus latency relationship, and further include one or more use case related triggers. The provisioned traffic descriptor may be defined by an operator of the OLT 102 and stored in memory 402. The use case related triggers may, for example, be manually input by an operator of the OLT 102 or a user of a respective one of the ONUs 1 to M, or may be determined by the bandwidth efficiency versus latency determination sub-module 501. Examples of use case related trigger variables which may be input to bandwidth efficiency versus latency determination sub-module 501 include:

(1) End-user demand—a demand from a user of the respective ONU may be received by the bandwidth efficiency versus latency determination sub-module 501, for example, for particularly low-latency communications, or for particularly high-efficiency bandwidth efficiency;

(2) PON level utilisation—a utilisation of the bandwidth resource of the ODN may be identified by the bandwidth efficiency versus latency determination sub-module 501, for example, by receipt of a utilisation status report from the respective ONU 1 to M, the OLT 102, or the ODN 103. For example, where it is identified that PON-level utilisation is relatively low, such that there exists in principle unutilised bandwidth resource, a relationship may be determined whereby latency is minimised at the cost of reduced bandwidth efficiency.

(3) T-CONT behaviour—based on analysis of the T-CONT traffic traces by the bandwidth efficiency versus latency determination sub-module 501, the type of traffic output by the respective T-CONT may be classified/identified, based on which the bandwidth efficiency versus latency determination sub-module 501 may determine desirable bandwidth efficiency and latency characteristics for communication of those traffic class(es);

(4) Operator queue configuration—Operators may configure certain parameters/functions for the T-CONTS for different applications (e.g., VLAN priority, IP CoS, etc), which configurations may be stored in the memory of the bandwidth allocation module 301; and (5) Time/day—the bandwidth efficiency versus latency determination sub-module 501 may determine the time/day of the upcoming time interval, for example, by reference to a clock of the OLT 102. This parameter may be relevant to the determination of the bandwidth efficiency vs latency relationship, inasmuch as the time/day may be considered a proxy indication of the expected types of traffic. For example, during working hours it may be expected that the traffic consists of mainly transfer of documents, for which relatively high latency may be acceptable. In contrast, outside of working hours it may be expected that the traffic includes a higher proportion of video-gaming data, for which relatively low latency transmission may be required.

(6) Inspection of IP/TCP header information—based on analysis of the T-CONT traffic trace payload data by the bandwidth efficiency vs latency determination sub-module 501, the IP or TCP header is derived and the fields of the headers are inspected (such as the Explicit Congestion Notification (ECN) related flags), based on which the bandwidth efficiency versus latency determination sub-module may determine desirable bandwidth efficiency and latency characteristics for communication of this T-CONT traffic. The ECN flags are related to enabling communication links for L4S (low-latency-low-loss scalable throughput).

Thus, based on one or more of the input variables, i.e., the input traffic descriptor and/or one or more of the use case related triggers, the bandwidth efficiency versus latency determination sub-module 501 determines a desired relationship between bandwidth efficiency and latency, i.e., a bandwidth efficiency versus latency trade-off, for communication of the respective T-CONT with the OLT. The output of the bandwidth efficiency versus latency determination sub-module 501, i.e., the determined relationship between bandwidth efficiency and latency, is supplied to the control means determination sub-module 502.

The control means determination sub-module 502 is configured to determine a method for employing the determined relationship between bandwidth efficiency and latency. In examples, referring to the Figure, control means determination module 502 outputs control signals to one or both of bandwidth estimation sub-module 503 and burst parameters assignment sub-module 505. For example, control means determination module 502 may select algorithms from respective groups of algorithms, or algorithm configurations, for output to the bandwidth estimation sub-module 403 and/or the burst parameters assignment sub-module 505 to thereby influence the operation of one or both of the bandwidth estimation sub-module 503 and/or the burst parameters assignment sub-module 505 based on the determined relationship between bandwidth efficiency and latency. For example, as described in further detail below, where the determined relationship between bandwidth efficiency and latency indicates that low-latency and low-bandwidth efficiency communication is desired, control means determination module 502 may select algorithms or algorithm configurations for output to the bandwidth estimation sub-module 503 and burst parameters assignment sub-module 505 which cause bandwidth estimations and burst parameters assignment which favour the desired low-latency and low-bandwidth efficiency communication.

Bandwidth estimation sub-module 503 is configured to estimate a bandwidth demand, for example, on a per T-CONT basis, in respect of an upcoming time interval (DBA cycle). Bandwidth estimation sub-module 503 is implemented based on the fact that completely accurate information about the actual demand of each T-CONT will not in practice be available to the bandwidth allocation module 301. Instead, the bandwidth allocation sub-module 503 estimates the expected bandwidth demand using a bandwidth estimation algorithm based on the input dynamic traffic information, and in dependence on the output of the control means determination sub-module 502. The input dynamic traffic information may include dynamic status reports output by the T-CONTS and/or traffic information metrics monitored by the bandwidth estimation sub-module 503. Bandwidth estimation sub-module 503 may, for example, have access to a group of two or more bandwidth estimation algorithms stored in the memory 402, whereby a first of the algorithms favours a bandwidth estimation that is likely to result in relatively low latency communication, e.g., where, for given dynamic traffic information, the resultant bandwidth estimation is likely to be relatively high, and a second of the algorithms favours a bandwidth estimation that is likely to result in high latency, e.g., where, for the given dynamic traffic information, the resultant bandwidth estimation is likely to be relatively low. In other words, bandwidth estimation sub-module 503 is configured to estimate upcoming bandwidth demand, e.g., on a per T-CONT basis, whereby the estimation is influenced by the output of the control means determination module 502, and so by the bandwidth efficiency versus latency relationship determined by the bandwidth efficiency versus latency determination sub-module 501.

Bandwidth allocation sub-module 504 is configured to grant a bandwidth allocation to the ONUs, e.g., on a per T-CONT basis, based on the bandwidth estimation generated by bandwidth estimation sub-module 503 and the input traffic descriptors (control parameters). For example, the input traffic descriptors could be provisioned by an operator of the OLT 102, and stored in the memory 402, and could define traffic control parameter, such as maximum bandwidth allocation and/or maximum latency for communication between the ONUs and the OLT, for example on a per T-CONT basis. The output of the bandwidth allocation module 504 is thus bandwidth allocations, which will be translated into timeslot/burst opportunities for the upcoming time interval, for communication between the ONUs and the OLT 102, e.g., on a per T-CONT basis.

Burst parameters assignment sub-module 505 is configured to allocate parameters for (the burst mode) communication between the ONUs and the OLT 102, for example, on a per T-CONT basis, based on the bandwidth allocation determined by the bandwidth allocation sub-module 504, the input traffic descriptors and the output of the control means determination sub-module 502. In short, the burst parameters assignment sub-module 505 is configured to define the desired number (frequency) and size of bursts, or other similar parameters, to support the bandwidth allocation generated by the bandwidth allocation sub-module 504.

Burst parameters assignment sub-module 505 is employed based on the recognition that the size and frequency of the bursts may impact the bandwidth efficiency and latency of communications between the ONUs and the OLT. For example, it may be understood that several short bursts may desirably result in reduced latency communications compared to fewer longer bursts, but conversely may undesirably result in reduced bandwidth efficiency, for reasons that will be described in further detail with reference to FIG. 6. Burst parameters assignment sub-module 505 is configured to allocate the bursts' parameters based on the output of the control means determination sub-module 502. Burst parameters assignment sub-module 505 may, for example, have access to a group of two or more burst parameters assignment/allocation algorithms stored in the memory 402, whereby a first of the algorithms favours a burst parameters allocation that is likely to result in relatively low latency communication, e.g., where, for given dynamic traffic information and bandwidth allocation, the resultant burst allocation is of multiple relatively short bursts and would result in lower latency, and a second of the algorithms favours a burst allocation that is likely to result in high bandwidth efficiency, e.g., where, for the given dynamic traffic information and bandwidth allocation, the resultant burst allocation is of fewer longer bursts and would result in higher latency. In other words, burst allocation sub-module 505 is configured to allocate parameters for the bursts to support the bandwidth allocations, e.g., on a per T-CONT basis, whereby the allocation is influenced by the output of the control means determination sub-module 502, and so by the bandwidth efficiency versus latency relationship determined by the bandwidth efficiency versus latency determination sub-module 501. The output of the burst parameters allocation sub-module 505 is supplied to bandwidth map generation sub-module 506.

Bandwidth map generation sub-module 506 is configured to generate a bandwidth map defining a TDM output schedule, i.e., burst schedule, for the ONUs, on a per T-CONT basis. The generated bandwidth map defines the timing and size of upstream transmission opportunities (bursts) for each ONU, on a per T-CONT basis, i.e., size and timing specifications are provided for each Alloc-ID. Bandwidth map generation sub-module 506 is further configured to communicate the generated bandwidth map to the ONUs via the ODN. An example of a bandwidth map generated by bandwidth map generation sub-module 506 is depicted in FIG. 7.

Figure 6:
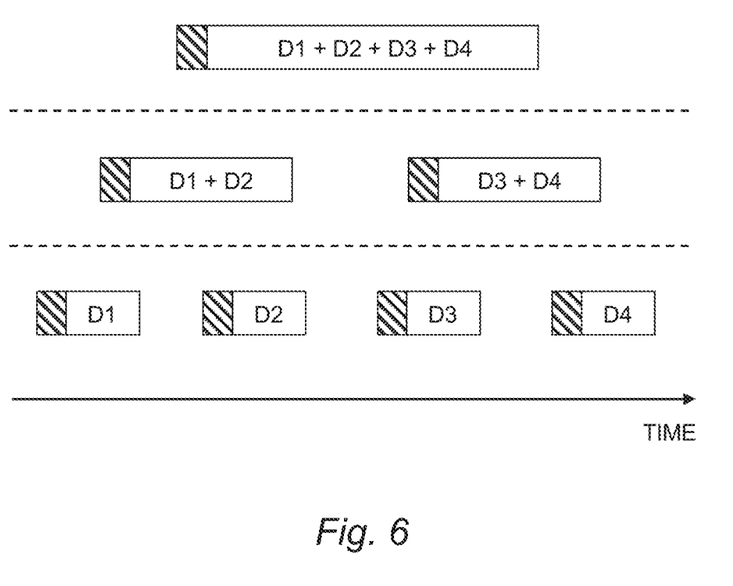
FIG. 6 shows schematically modes of burst parameters assignment for communication by the optical network units.

Referring next to FIG. 6, as previously described with reference to FIG. 5, the burst parameters assignment/allocation may have an impact on the bandwidth efficiency and latency of communications between the ONUs and the OLT. This is at least in part because each burst of data payload incurs an overhead to be able to receive the burst correctly at the OLT, for example, a pre-amble to train the equalizer and a delimiter to identify the end of the overhead. It may thus be understood that allocating many small bursts to satisfy a bandwidth allocation may reduce the latency, as the smaller bursts may be more easily scheduled into a busy transmission schedule, but may also reduce the bandwidth efficiency due to the additional overhead of each burst.

Figure 7:
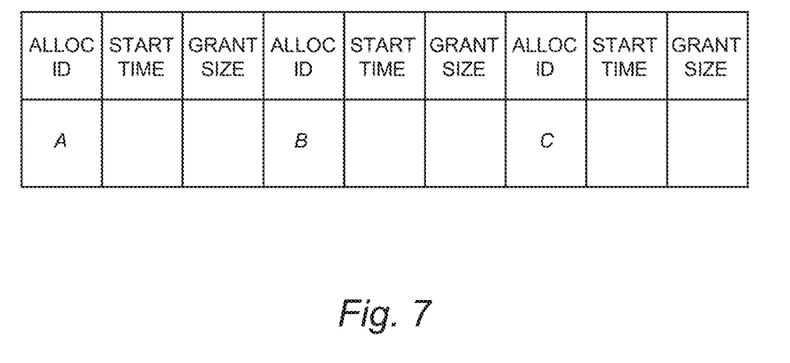
FIG. 7 shows schematically a table defining communication parameters for the optical network units.

Referring next to FIG. 7, the bandwidth map generated by the bandwidth map generation sub-module 506 defines a TDM output schedule, i.e., burst schedule, for the ONUs, on a per T-CONT basis. The generated bandwidth map defines the size and timing of upstream transmission opportunities for each ONU, on a per T-CONT basis, i.e., size and timing specifications may be provided for each Alloc-ID. The example table depicted in FIG. 6 includes map data for Alloc-IDs A to C, i.e., the T-CONTs of ONU 1. In other applications the generated bandwidth map may include the map data for the T-CONTs of all of the ONUs 1 to M.

Figure 8:
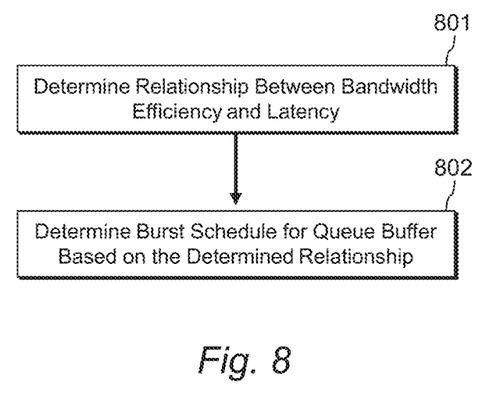
FIG. 8 shows processes involved in allocating bandwidth module performed by the bandwidth allocation module.

Referring finally to FIG. 8, in examples the computer program for determining a burst schedule for the T-CONTs, i.e., the queue buffers, of the ONUs stored in the memory 302 comprises two stages.

At stage 801, the computer program causes the processor 401 to determine respective relationships between bandwidth efficiency and latency for communication of contents of each of the queue buffers, i.e., the T-CONTS, of the ONUs to the OLT. As described previously with reference to FIG. 4, in examples stage 801 may be performed by bandwidth efficiency vs latency determination sub-module 501, based on the variables of one or both of the bandwidth efficiency versus latency descriptors (for example, the descriptor per T-CONT) and/or the use case related trigger(s).

At stage 802, the computer program causes the processor 301 to determine a burst schedule for the queue buffers, i.e., the T-CONTS, for communication of contents of the T-CONTS to the OLT, based on the relationship(s) between bandwidth efficiency and latency determined at stage 801. As described previously with reference to FIG. 5, in examples stage 802 may be performed by control means determination sub-module 502, bandwidth estimation sub-module 503, bandwidth allocation sub-module 504, and burst parameters assignment sub-module 505. In example, stage 802 may further comprise generating a map recording the determined burst schedules, e.g., by translating the burst parameters to specific burst size and timing, and communicating the map to the ONUs, which may be performed by bandwidth generation sub-module 506.

Although the present invention and its advantages have been described in detail, it should be understood that various changes, substitutions and alterations can be made herein without departing from the spirit and scope of the invention as defined by the appended claims. In the claims, the word "comprising" does not exclude other elements or steps, and the indefinite article "a" or "an" does not exclude a plurality.

The invention claimed is:

1. An optical line terminal comprising:
   at least one processor; and
   at least one memory including machine-readable instructions,
   wherein the at least one memory and the machine-readable instructions are configured to, with the at least one processor, cause the optical line terminal to
      determine based on one or more variables a trade-off between bandwidth efficiency and latency for communication of contents of a queue buffer of an optical network unit with the optical line terminal via an optical distribution network, and
      determine a burst schedule for the queue buffer based on the determined trade-off.

2. The optical line terminal of claim 1, wherein the at least one memory and the machine-readable instructions are configured to, with the at least one processor, cause the optical line terminal to determine the burst schedule for the queue buffer by:
   determining a bandwidth for communication of contents of the queue buffer of the optical network unit with the optical line terminal,
   determining a burst parameters assignment for communication of contents of the queue buffer of the optical network unit with the optical line terminal based on the determined bandwidth, and
   determining the burst schedule based on the determined burst parameters assignment.

3. The optical line terminal of claim 2, wherein the at least one memory and the machine-readable instructions are configured to, with the at least one processor, cause the optical line terminal to determine the bandwidth based on the determined trade-off.

4. The optical line terminal of claim 1, wherein the at least one memory and the machine-readable instructions are configured to, with the at least one processor, cause the optical line terminal to determine the burst schedule for the queue buffer by:
   determining a burst parameters assignment for communication of contents of the queue buffer of the optical network unit with the optical line terminal based on the determined trade-off, and
   determining the burst schedule based on the determined burst parameters assignment.

5. The optical line terminal of claim 2, wherein the at least one memory and the machine-readable instructions are configured to, with the at least one processor, cause the optical line terminal to determine the bandwidth by:
   selecting a function of a plurality of functions stored in the at least one memory or modifying a parameter of a function stored in the at least one memory based on the determined trade-off, and
   determining the bandwidth based on the selected or modified function.

6. The optical line terminal of claim 3, wherein the at least one memory and the machine-readable instructions are configured to, with the at least one processor, cause the optical line terminal to determine the burst parameters assignment by:
   selecting a function of a plurality of functions stored in the at least one memory or modifying a parameter of a function stored in the at least one memory based on the determined trade-off, and
   determining the burst parameters assignment based on the selected or modified function.

7. The optical line terminal of claim 1, wherein the at least one memory and the machine-readable instructions are configured to, with the at least one processor, cause the optical line terminal to determine the trade-off by:
   retrieving from the at least one memory a variable characterizing the trade-off between bandwidth efficiency and latency for the communication.

8. The optical line terminal of claim 1, wherein the at least one memory and the machine-readable instructions are configured to, with the at least one processor, cause the optical line terminal to determine the trade-off by:
   receiving as an input to the optical line terminal a variable defining a communication preference for a communication of contents of the queue buffer of the optical network unit with the optical line terminal and determining the trade-off based on the communication preference.

9. The optical line terminal of claim 1, wherein the at least one memory and the machine-readable instructions are configured to, with the at least one processor, cause the optical line terminal to determine the trade-off by:
evaluating a variable representing a utilization rate of the optical distribution network for prior communications between the optical network unit and the optical line terminal and determining the trade-off based on the utilization rate.

10. The optical line terminal of claim 1, wherein the at least one memory and the machine-readable instructions are configured to, with the at least one processor, cause the optical line terminal to determine the trade-off by:
characterizing a variable representing a type of communications of contents of the queue buffer of the optical network unit with the optical line terminal and determining the trade-off based on the type of communications.

11. The optical line terminal of claim 1, wherein the at least one memory and the machine-readable instructions are configured to, with the at least one processor, cause the optical line terminal to determine the trade-off by:
identifying a time for communications of contents of the queue buffer of the optical network unit with the optical line terminal based on a time-denoting variable and determining the trade-off based on the identified time.

12. The optical line terminal of claim 1, wherein the at least one memory and the machine-readable instructions are configured to, with the at least one processor, cause the optical line terminal to determine the trade-off by:
characterizing a variable representing IP or TCP header related fields for a communication of contents of the queue buffer of the optical network unit with the optical line terminal and determining the trade-off based on the IP or TCP header related fields.

13. The optical line terminal of claim 1, wherein the optical network unit comprises a plurality of discrete queue buffers, and the at least one memory and the machine-readable instructions are configured to, with the at least one processor, cause the optical line terminal to determine respective burst schedules for each of the plurality of discrete queue buffers.

14. A computer-implemented method for determining an burst schedule for a queue buffer of an optical network unit, the method comprising:
determining based on one or more variables a trade-off between bandwidth efficiency and latency for communication of contents of the queue buffer with an optical line terminal via an optical distribution network, and
determining a burst schedule for the queue buffer based on the determined trade-off.

15. A non-transitory computer readable medium storing instructions, which when executed by a computer, cause the computer to perform the method of claim 14.

* * * * *